United States Patent
Cheng et al.

(10) Patent No.: US 9,955,142 B2
(45) Date of Patent: Apr. 24, 2018

(54) ON-LINE STEREO CAMERA CALIBRATION DEVICE AND METHOD FOR GENERATING STEREO CAMERA PARAMETERS

(71) Applicant: MEDIATEK INC., Hsin-Chu (TW)

(72) Inventors: Chia-Ming Cheng, Hsinchu (TW); Po-Hao Huang, Kaohsiung (TW); Yuan-Chung Lee, Tainan (TW); Chung-Hung Tsai, Hsin-Chu Hsien (TW)

(73) Assignee: MEDIATEK INC., Hsin-Chu (TW)

( * ) Notice: Subject to any disclaimer, the term of this patent is extended or adjusted under 35 U.S.C. 154(b) by 203 days.

(21) Appl. No.: 14/322,930

(22) Filed: Jul. 3, 2014

(65) Prior Publication Data

US 2015/0009291 A1    Jan. 8, 2015

Related U.S. Application Data

(60) Provisional application No. 61/843,221, filed on Jul. 5, 2013.

(51) Int. Cl.
*H04N 13/02* (2006.01)

(52) U.S. Cl.
CPC ....... *H04N 13/0296* (2013.01); *H04N 13/025* (2013.01); *H04N 13/0239* (2013.01)

(58) Field of Classification Search
CPC ........... H04N 13/0296; H04N 13/0239; H04N 13/025
See application file for complete search history.

(56) References Cited

U.S. PATENT DOCUMENTS

| 3,621,127 A | 11/1971 | Hope |
| 6,594,600 B1 * | 7/2003 | Arnoul ............... G01B 11/2755 382/154 |

(Continued)

FOREIGN PATENT DOCUMENTS

| CN | 101273621 A | 9/2008 |
| CN | 101706957 | 5/2010 |

(Continued)

OTHER PUBLICATIONS

Lowe, "Distinctive Image Features from Scale-Invariant Keypoints," International Journal of Computer Vision, 60(2), 2004, pp. 91-110.*

(Continued)

*Primary Examiner* — Thai Tran
*Assistant Examiner* — Christopher T Braniff
(74) *Attorney, Agent, or Firm* — Winston Hsu

(57) ABSTRACT

An on-line stereo camera calibration method employed by an electronic device with a stereo camera device includes: retrieving a feature point set, and utilizing a stereo camera calibration circuit on the electronic device to calculate a stereo camera parameter set based on the retrieved feature point set. In addition, an on-line stereo camera calibration device on an electronic device with a stereo camera device includes a stereo camera calibration circuit. The stereo camera calibration circuit includes an input interface and a stereo camera calibration unit. The input interface is used to retrieve a feature point set. The stereo camera calibration unit is used to calculate a stereo camera parameter set based on at least the retrieved feature point set.

18 Claims, 9 Drawing Sheets

(56) References Cited

U.S. PATENT DOCUMENTS

| | | | |
|---|---|---|---|
| 6,768,509 B1 † | 7/2004 | Bradski | |
| 7,671,891 B2 | 3/2010 | Fitzgibbon | |
| 8,218,052 B2 | 7/2012 | Upton | |
| 8,368,762 B1 * | 2/2013 | Chen | H04N 17/002 348/187 |
| 8,717,422 B2 | 5/2014 | Hewes | |
| 2004/0174439 A1 | 9/2004 | Upton | |
| 2006/0082879 A1 * | 4/2006 | Miyoshi | H04N 13/0217 359/462 |
| 2006/0204038 A1 | 9/2006 | Yokota | |
| 2011/0242413 A1 | 10/2011 | Azzopardi | |
| 2012/0105591 A1 * | 5/2012 | Kim | H04N 17/002 348/46 |
| 2012/0162511 A1 | 6/2012 | Hewes | |
| 2012/0224032 A1 * | 9/2012 | Takiguchi | G06T 7/0028 348/47 |
| 2012/0242806 A1 | 9/2012 | Ibrahim | |
| 2012/0274627 A1 | 11/2012 | Huggett | |
| 2013/0163854 A1 * | 6/2013 | Cheng | G06T 15/205 382/154 |
| 2013/0271579 A1 * | 10/2013 | Wang | G01B 11/002 348/47 |
| 2014/0098194 A1 | 4/2014 | Goma | |
| 2014/0307068 A1 | 10/2014 | Song | |

FOREIGN PATENT DOCUMENTS

| | | |
|---|---|---|
| CN | 102033415 | 4/2011 |
| CN | 102227746 A | 10/2011 |
| CN | 102436660 A | 5/2012 |
| CN | 102638693 A | 8/2012 |
| CN | 102859989 A | 1/2013 |
| CN | 102860016 A | 1/2013 |
| CN | 103179413 A | 6/2013 |
| EP | 1 684 531 A2 | 7/2006 |
| JP | 2002344800 A | 11/2002 |
| JP | 201398877 A | 5/2013 |
| KR | 1020100112840 | 10/2010 |
| WO | 2010029040 A2 | 3/2010 |

OTHER PUBLICATIONS

Lucchese, "Geometric Calibration of Digital Cameras Through Multi-view Rectification," Image and Vision Computing, 23, 2005, pp. 517-539.*

"International Search Report" dated Sep. 29, 2014 for International application No. PCT/CN2014/081674, International filing date: Jul. 4, 2014.

"International Search Report" dated Oct. 15, 2014 for International application No. PCT/CN2014/081671, International filing date: Jul. 4, 2014.

Tsai, A Versatile Camera Calibration Technique for High-Accuracy 3D Machine Vision Metrology Using Off-the-Shelf TV Cameras and Lenses, IEEE Journal of Robotics and Automation, vol. RA-3, No. 4, pp. 323-344, Aug. 1987.

Wu, Title of Invention: Synchronization Controller for Multi-Sensor Camera Device and Related Synchronization Method, U.S. Appl. No. 14/322,925, filed Jul. 3, 2014.

Xiameng Qin et al., Stereo Camera Calibration with an Embedded Calibration Device and Scene Features, p. 2306-2310, Dec. 11-14, 2012, Proceedings of the 2012 IEEE International Conference on Robotics and Biomimetics, Guangzhou, China.†

* cited by examiner
† cited by third party

ON-LINE STEREO CAMERA CALIBRATION DEVICE AND METHOD FOR GENERATING STEREO CAMERA PARAMETERS

CROSS REFERENCE TO RELATED APPLICATIONS

This application claims the benefit of U.S. provisional application No. 61/843,221, filed on Jul. 5, 2013 and incorporated herein by reference.

BACKGROUND

The disclosed embodiments of the present invention relate to calibrating a stereo camera device, and more particularly, to on-line stereo camera calibration device and method for generating stereo camera parameters.

With the development of science and technology, users are pursing stereoscopic and more real images rather than high quality images. There are two techniques of present stereo image display. One is to use a video output apparatus which collaborates with glasses (such as anaglyph glasses, polarization glasses or shutter glasses), while the other is to directly use a video output apparatus without any accompanying glasses. No matter which technique is utilized, the main theory of stereo image display is to make the left eye and the right eye see different images (i.e., one left-view image and one right-view image), thus the brain will regard the different images seen from two eyes as one stereo image.

A stereo image pair of one left-view image and one right-view image may be obtained by using a stereo camera device. The stereo camera device is a camera that has two image sensors used to take two pictures at the same time. The stereo image pair, including one left-view image and one right-view image, therefore creates the three-dimensional (3D) effect when viewed by the user. For example, a smartphone may be equipped with a stereo camera module composed of two image sensors, each having a lens. The capture result of the stereo camera module may be processed and then displayed on a 3D panel of the smartphone.

However, when a module house manufactures the stereo camera module, there maybe inevitable errors in the lens module, the image sensor module, and/or the stereo camera layout of the stereo camera module. As a result, the principle points (i.e., centers) of a left-view image and a right-view image included in one stereo image pair do not possess the X-axis colinearity, Y-axis of the left-view image is not parallel with Y-axis of the right-view image, and/or Z-axis of the left-view image is not parallel with Z-axis of the right-view image.

After the stereo camera module is assembled in the smartphone, an image processing chip of the smartphone is required to apply image calibration upon each stereo image pair generated from the stereo camera module to avoid/mitigate image quality degradation resulting from inherent errors of the stereo camera module. Based on the calibration model employed by the image processing chip of the smartphone, the module house has to perform an off-line stereo camera calibration to generate stereo camera parameters needed by the currently employed calibration model. However, when the image processing chip of the smartphone is modified to employ a different calibration model, the module house needs to perform another off-line stereo camera calibration to generate new stereo camera parameters needed by the currently employed calibration model.

Moreover, the stereo camera calibration procedure is supposed to be performed after the assembly process. Actually, the stereo camera calibration procedure is performed by the module house rather than the assembly plant. Thus, the relative relation between image sensors should keep the same in the module house and the assembly plant. However, it changes in the assembly plant. As a result, the image calibration performed based on the stereo camera parameters provided by the module house may fail to effectively mitigate image quality degradation resulting from inherent errors of the stereo camera module.

SUMMARY

In accordance with exemplary embodiments of the present invention, on-line stereo camera calibration device and method for generating stereo camera parameters are proposed to solve the above-mentioned problem.

According to a first aspect of the present invention, an exemplary on-line stereo camera calibration method is disclosed. The exemplary on-line stereo camera calibration method is employed by an electronic device with a stereo camera device, and includes: retrieving a feature point set, and utilizing a stereo camera calibration circuit on the electronic device to calculate a stereo camera parameter set based on at least the retrieved feature point set.

According to a second aspect of the present invention, an exemplary on-line stereo camera calibration device on an electronic device with a stereo camera device is disclosed. The exemplary on-line stereo camera calibration device includes a stereo camera calibration circuit. The stereo camera calibration circuit includes an input interface and a stereo camera calibration unit. The input interface is configured to retrieve a feature point set. The stereo camera calibration unit is configured to calculate a stereo camera parameter set based on at least the retrieved feature point set.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

One concept of the present invention is to provide a cross-platform stereo camera calibration which is an on-line stereo camera calibration using a feature point set provided by a module house. The same feature point set can be used to provide information needed by different calibration models. Thus, when an image processing chip of an electronic device (e.g., a mobile phone) is modified to employ a different calibration model used by a new platform, the module house does not need to provide a new feature point set for the stereo camera module assembled in the mobile phone. Another concept of the present invention is to provide a learning-based stereo camera calibration which is an on-line stereo camera calibration using a feature point set provided via machine learning. A self-learning process is performed to gather feature points based on stereo image pairs each generated by a stereo camera device assembled in an electronic device. Thus, the feature point set is obtained after the assembly process is done in the assembly plant. Even though the relative relation between image sensors changes due to certain factors, the feature point set will be updated by the self-learning process. Based on the feature point set retrieved from a learning dataset maintained by the self-learning process, the image calibration performed on the electronic device is capable of avoiding/mitigating image quality degradation resulting from errors of the stereo camera device. The present invention proposes two stereo camera calibration solutions of the symmetric/asymmetric stereo camera system for mass production. Further details are described as below.

Figure 1:
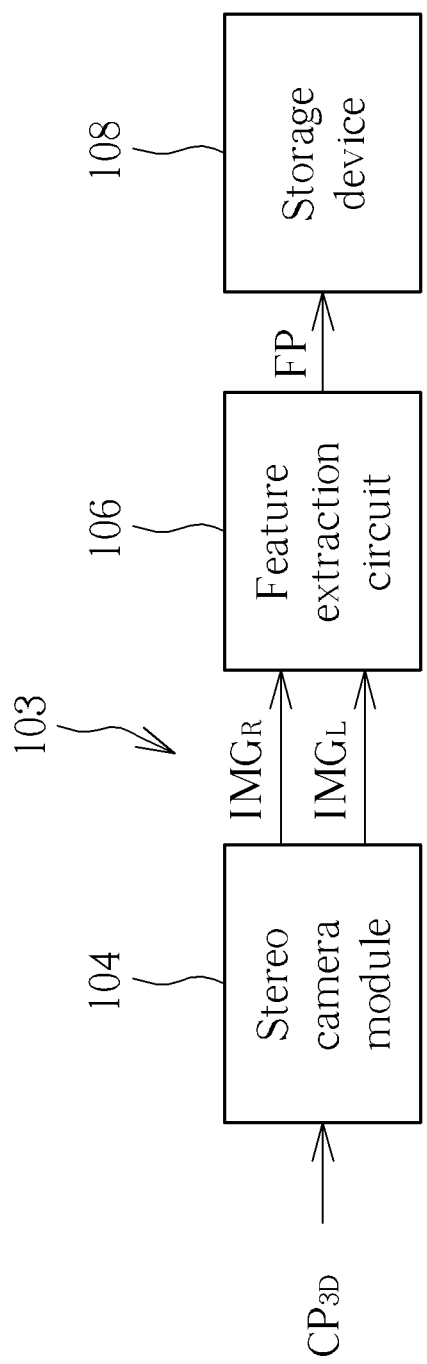
FIG. 1 is a diagram illustrating generation of a feature point set in a module house according to an embodiment of the present invention.

FIG. 1 is a diagram illustrating generation of a feature point set in a module house according to an embodiment of the present invention. The module house manufactures a stereo camera module 104 composed of multiple image sensors, each having a lens. For example, the stereo camera module 104 may have at least two image sensors for capturing one left-view image and one right-view image concurrently. The module house sets up a calibration environment by mounting the stereo camera module 104 on a mounting device (not shown). Next, the module house may perform one-shot calibration upon the stereo camera module 104. Specifically, the stereo camera module 104 is used to shot a 3D calibration pattern $CP_{3D}$ only once to generate a stereo image pair 103 including a left-view image $IMG_L$ and a right-view image $IMG_R$. It should be noted that using the 3D calibration pattern $CP_{3D}$ to realize the one-shot calibration is for illustrative purposes only. Alternatively, a different calibration pattern may be used by the module house. In addition, the stereo image pair 103 may be generated by shooting the calibration pattern more than once.

Figure 2:
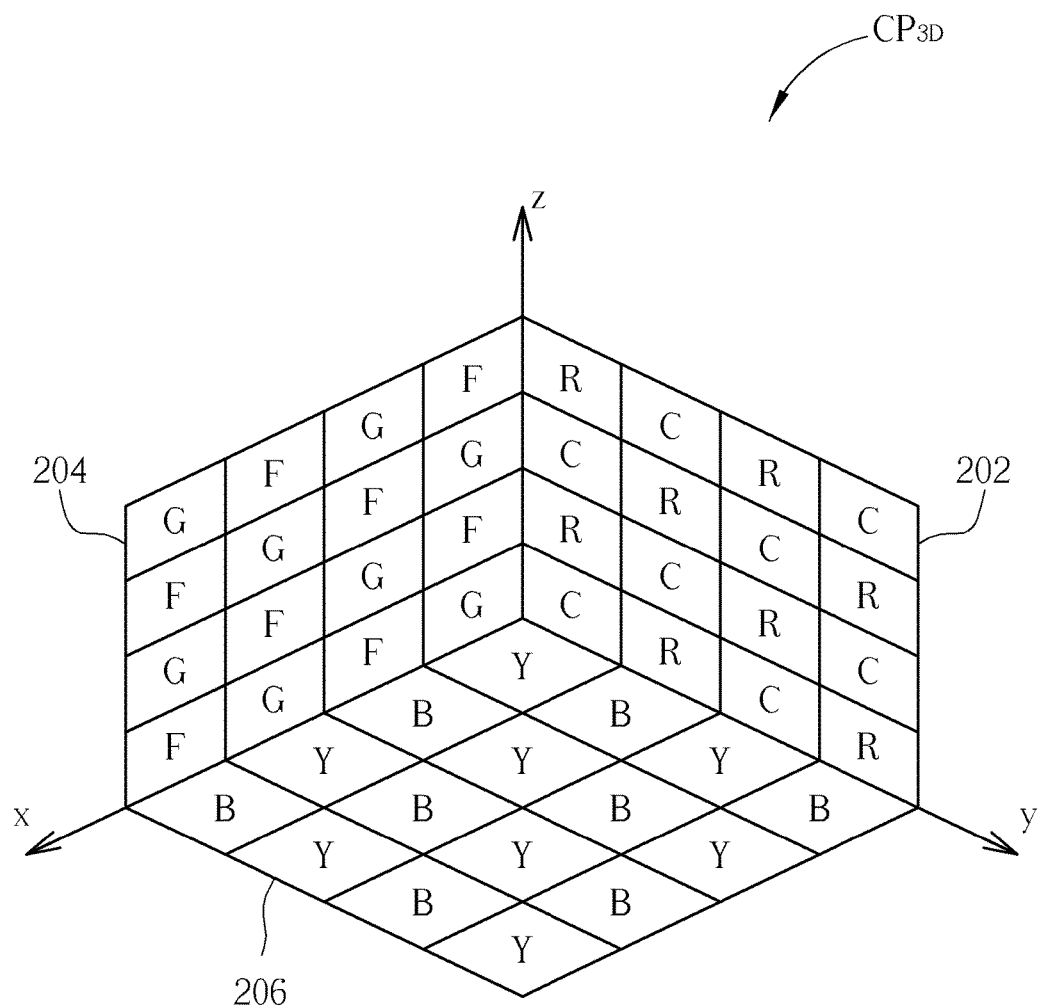
FIG. 2 is a diagram illustrating an example of a three-dimensional calibration pattern used for one-shot calibration.

FIG. 2 is a diagram illustrating an example of the 3D calibration pattern $CP_{3D}$ used for one-shot calibration. As shown in FIG. 2, the 3D calibration pattern $CP_{3D}$ has one color pattern 202 located at the y-z plane, another color pattern 204 located at the x-z plane, and yet another color pattern 206 located at the x-y plane. Each of the color patterns 202-206 has a checkerboard arrangement of different color components. For example, the color pattern 202 has a red (255, 0, 0) color component (denoted by "R" in FIG. 2) and a cyan (0, 255, 255) color component (denoted by "C" in FIG. 2) distributed therein, the color pattern 204 has a green (0, 255, 0) color component (denoted by "G" in FIG. 2) and a fuchsia (255, 0, 255) color component (denoted by "F" in FIG. 2) distributed therein, and the color pattern 206 has a blue (0, 0, 255) color component (denoted by "B" in FIG. 2) and a yellow (255, 255, 0) color component (denoted by "Y" in FIG. 2) distributed therein. It should be noted that the 3D calibration pattern $CP_{3D}$ is for illustrative purposes only, and is not meant to be a limitation of the present invention. For example, a different calibration pattern may be used in another one-shot calibration design.

The stereo camera module 104 generates the stereo image pair 103, including the left-view image $IMG_L$ and the right-view image $IMG_R$, to a feature extraction circuit 106. The feature extraction circuit 106 is configured to apply feature extraction to the left-view image $IMG_L$ and the right-view image $IMG_R$. Based on the design of the 3D calibration pattern $CP_{3D}$, the feature extraction circuit 106 may detect grid points found in the left-view image $IMG_L$ and the right-view image $IMG_R$ as feature points, and store a feature point set FP composed of extracted grid points into a storage device 108. For example, the storage device 108 may be a non-volatile memory such as an electrically erasable programmable read only memory (EEPROM). The stereo camera module 104 and the storage device 108 are both provided from the module house to an assembly plant, such that the stereo camera module 104 and the associated storage device 108 will be assembled in the same electronic device (e.g., a mobile phone) produced in the assembly plant.

Figure 3:
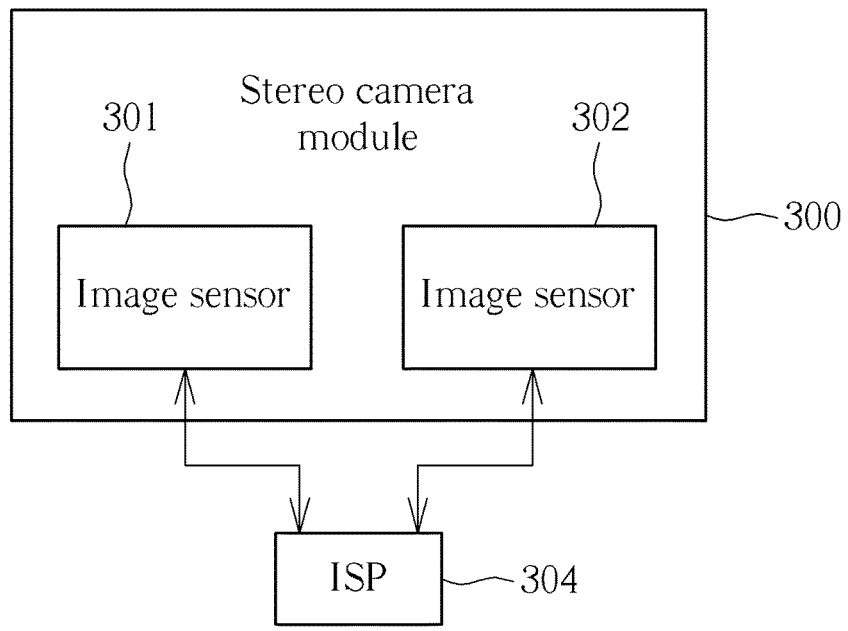
FIG. 3 is a diagram illustrating a stereo camera module with symmetric image sensors.
Figure 4:
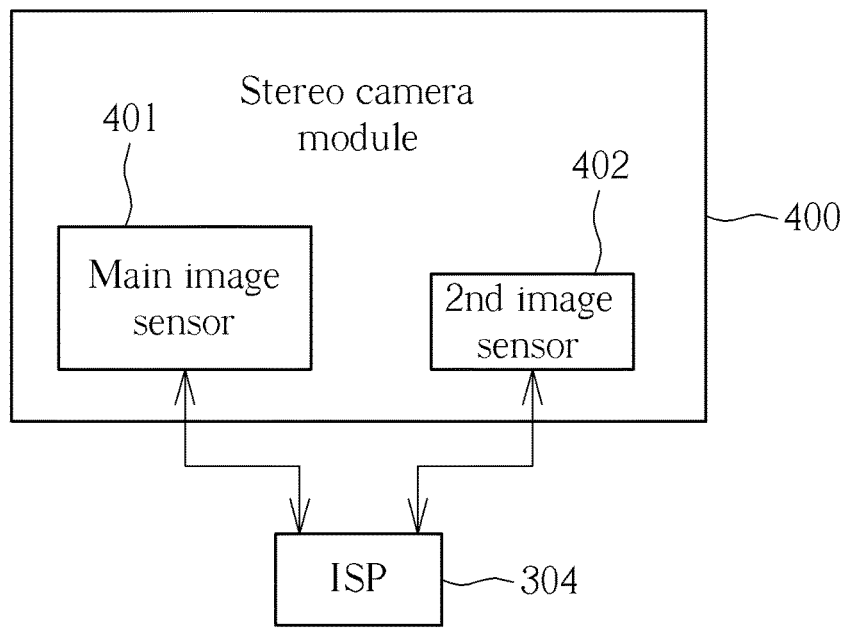
FIG. 4 is a diagram illustrating a stereo camera module with asymmetric image sensors.

As mentioned above, the module house performs an off-line feature extraction to obtain the feature point set FP, and does not need to perform an off-line stereo camera calibration to obtain stereo camera parameters. Please note that the stereo camera module 104 may be a stereo camera module 300 with symmetric image sensors 301 and 302 (i.e., image sensors with the same resolution), as shown in FIG. 3, or may be a stereo camera module 400 with asymmetric image sensors, including a main image sensor 401 and a second (auxiliary) image sensor 402 (i.e., image sensors with different resolutions), as shown in FIG. 4. Hence, the module house performs the feature extraction (e.g., one-shot feature extraction), regardless of the type of the stereo camera module 104. In one embodiment, when the stereo camera module 300/400 is assembled in an electronic device, the stereo camera module 300/400 may be connected to an image signal processor (ISP) 304 with a bridge circuit integrated therein. Hence, no external bridge integrated circuit (IC) coupled between an ISP and image sensors of a stereo camera module is needed.

Figure 5:
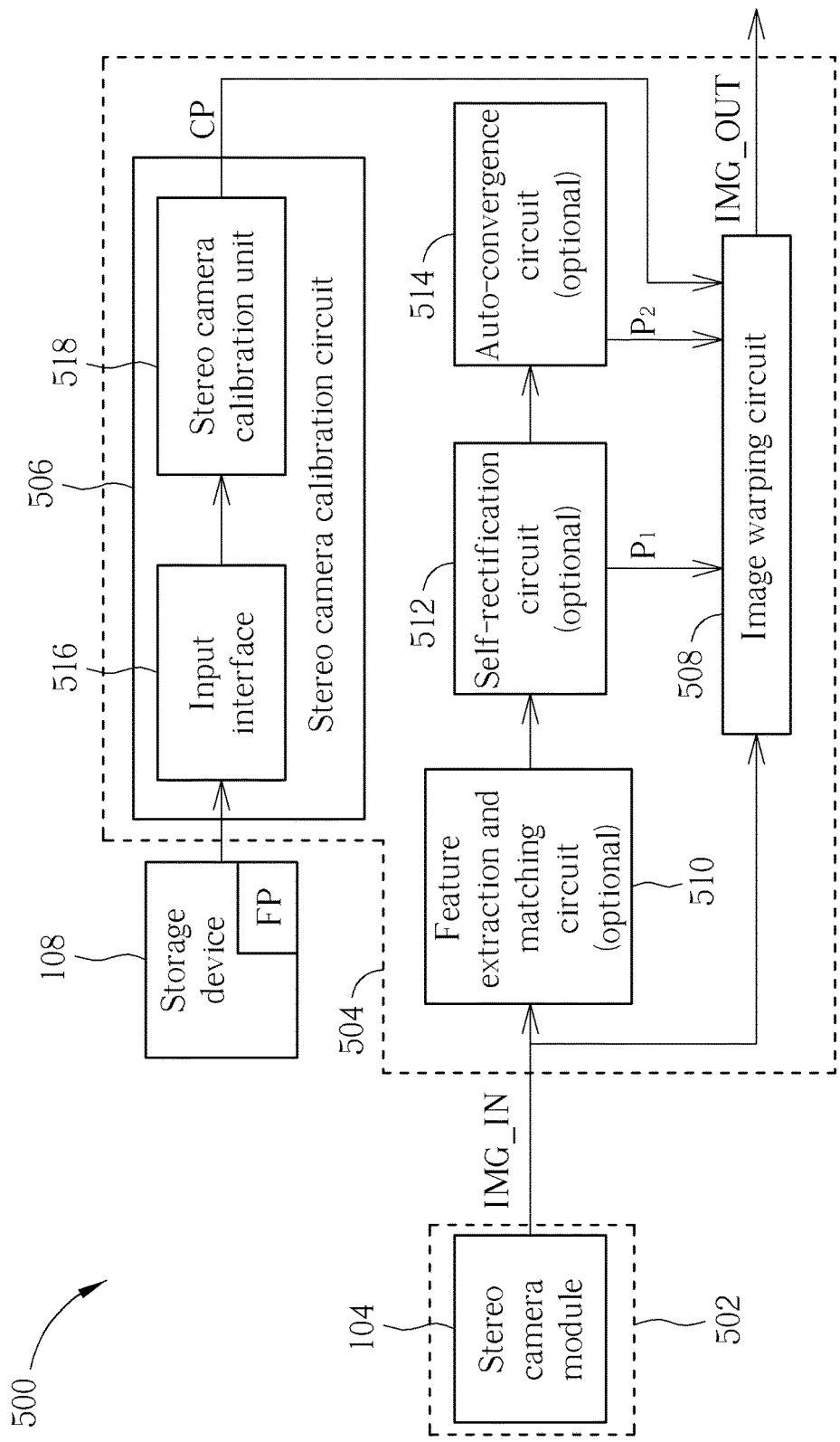
FIG. 5 is a diagram illustrating an electronic device supporting an on-line stereo camera calibration according to an embodiment of the present invention.

In accordance with the present invention, an on-line stereo camera calibration is performed in an electronic device with the stereo camera module 104 and the storage device 108 assembled therein to thereby obtain stereo camera parameters. FIG. 5 is a diagram illustrating an electronic device supporting an on-line stereo camera calibration according to an embodiment of the present invention. By way of example, but not limitation, the electronic device 500 may be a mobile phone. As shown in FIG. 5, the electronic device 500 includes a stereo camera device 502 and an on-line stereo camera calibration device 504. In this embodiment, the stereo camera device 502 is the stereo camera module 104 shown in FIG. 1. Hence, the associated storage device 108 with the feature point set FP stored therein is also assembled in the same electronic device 500. The on-line stereo camera calibration device 504 may be integrated in a baseband processing chip of the electronic device 500. In this embodiment, the on-line stereo camera calibration device 504 includes a stereo camera calibration circuit 506, an image warping circuit 508, and one or more optional image processing circuits (e.g., feature extraction and matching circuit 510, self-rectification circuit 512 and/or auto-convergence circuit 514).

The stereo camera calibration circuit 506 includes an input interface 516 and a stereo camera calibration unit 518. The input interface 516 is configured to retrieve the feature point set FP from the storage device 108. As mentioned above, the feature point set FP may be obtained through one-shot calibration performed at the module house that manufactures the stereo camera module 104. Thus, the feature point set FP is available in the storage device (e.g., EEPROM) 108 provided by the module house. The input interface 516 may be a memory interface responsible for reading the feature point set FP and supplying the feature point set FP to the stereo camera calibration unit 518. The stereo camera calibration unit 518 is configured to calculate a stereo camera parameter set CP according to the retrieved feature point set FP. Specifically, based on the calibration model employed by the image warping circuit 508, the stereo camera calibration unit 518 generates the stereo camera parameter set CP needed by the employed calibration model. For example, when the image warping circuit 508 is configured to employ a single-warp solution, the stereo camera calibration unit 518 generates one stereo camera parameter set CP meeting the requirement of the single-warp solution; and when the image warping circuit 508 is configured to employ a dual-warp solution, the stereo camera calibration unit 518 generates another stereo camera parameter set CP meeting the requirement of the dual-warp solution. To put it simply, one feature point set FP is generated by the module house, and multiple strategies can be supported by the on-line stereo camera calibration device 504 for stereo camera calibration. Hence, when the on-line stereo camera calibration device 504 and the stereo camera module 104 are employed by respective electronic devices having different hardware configurations/limitations, the on-line stereo camera calibration device 504 can perform different stereo camera calibrations on the electronic devices based on the same feature point set FP. Due to the proposed stereo camera calibration methodology, the effort and cost of the module house can be reduced, and the flexibility of the stereo camera calibration can be enhanced greatly.

The stereo camera parameter set CP may be referenced for geometric calibration of the stereo camera. For example, the stereo camera parameter set CP may include intrinsic parameters of the stereo camera module 104 and/or extrinsic parameters of the stereo camera module 104. The intrinsic parameters are related to the relationship between a lens and a corresponding image sensor, and may have lens distortion and a calibration matrix, including focal lengths, principle points, skew parameters, etc. The extrinsic parameters are related to the relationship between one set of a lens and a corresponding image sensor and the other set of a lens and a corresponding image sensor, and may have translation correction, rotational correction, etc.

The image warping circuit 508 is configured to perform an image warping operation upon a stereo image input IMG_IN derived from an output of the stereo camera device 502 (i.e., stereo camera module 104 in this embodiment) according to at least the stereo camera parameter set CP, and accordingly generate a calibrated stereo image output IMG_OUT. It should be noted that the stereo image input IMG_IN may be a direct stereo capture output of the stereo camera module 104 or may be a processing result generated from at least one image processing stage in an ISP (e.g., 304 shown in FIG. 3/FIG. 4) according to the stereo capture output of the stereo camera module 104. The image quality degradation resulting from errors of the stereo camera module 104 can be avoided/mitigated by the image warping operation performed based on at least the stereo camera parameter set CP. It should be noted that the image warping operation may be a single-warp operation (which adjusts only one of a left-view image and a right-view image included in a stereo image pair) or a dual-warp operation (which adjusts both of a left-view image and a right-view image included in a stereo image pair), depending upon the actual platform design of the electronic device 500.

In addition to the stereo camera parameter set CP, the image warping circuit 508 may be configured to use more parameter sets to make the calibrated stereo image output IMG_OUT have better visual quality. For example, the feature extraction and matching circuit 510 may be implemented to process the stereo image input IMG_IN to extract feature points in a left-view image and a right-view image included in a stereo image pair and find the matching/correspondence between the left-view image and the right-view image included in the stereo image pair. The self-rectification circuit 512 refers to a feature extraction and matching result to determine a self-rectification parameter set $P_1$ used to refine the geometry constraint. The auto-convergence circuit 514 refers to an output of the feature extraction and matching circuit 510 (if the self-rectification circuit 512 is omitted) or an output of the self-rectification circuit 512 (if the self-rectification circuit 512 is used) to determine an auto-convergence parameter set $P_2$ used to adjust the disparity between the left-view image and the right-view image included in the stereo image pair for better visual effect on a 3D display. In this case, the image warping circuit 508 may generate the calibrated stereo image output IMG_OUT by applying image warping to the stereo image input IMG_IN according to the stereo camera parameter set CP and at least one of the self-rectification parameter set $P_1$ and the auto-convergence parameter set $P_2$.

Figure 6:
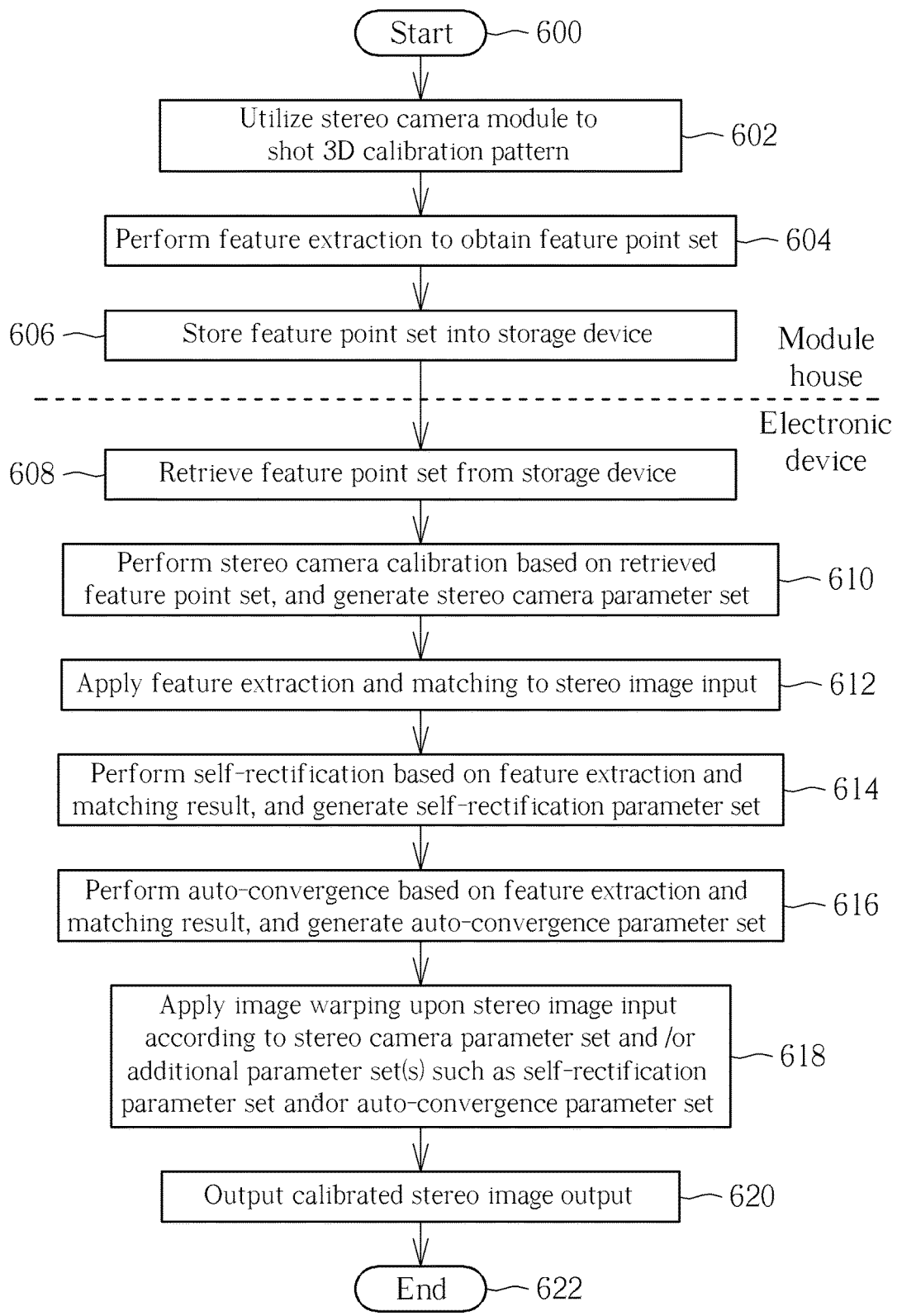
FIG. 6 is a flowchart illustrating a first stereo camera calibration solution according to an embodiment of the present invention.

FIG. 6 is a flowchart illustrating a first stereo camera calibration solution according to an embodiment of the present invention. Provided that the result is substantially the same, the steps are not required to be executed in the exact order shown in FIG. 6. The first stereo camera calibration solution proposed by the present invention may include following steps.

Step 600: Start.

Step 602: Utilize a stereo camera module to shot a 3D calibration pattern

Step 604: Perform a feature extraction procedure to obtain a feature point set of the 3D calibration pattern.

Step 606: Store the feature point set into a storage device (e.g., an EEPROM).

Step 608: Retrieve the feature point set from the storage device.

Step 610: Perform a stereo camera calibration procedure based on the retrieved feature point set, and accordingly generate a stereo camera parameter set.

Step 612: Apply feature extraction and matching to a stereo image input derived from a stereo capture output of the stereo camera module.

Step 614: Perform a self-rectification procedure based on a feature extraction and matching result, and accordingly generate a self-rectification parameter set.

Step 616: Perform an auto-convergence procedure based on the feature extraction and matching result, and accordingly generate an auto-convergence parameter set.

Step 618: Apply image warping upon the stereo image input according to at least the stereo camera parameter set. For example, the image warping operation may be performed based on the stereo camera parameter set and additional parameter set(s) such as the self-rectification parameter set and/or the auto-convergence parameter set.

Step 620: Output a calibrated stereo image output.

Step 622: End.

It should be noted that steps 602-606 are performed in a module house that manufactures a stereo camera module, and steps 608-620 are performed on an electronic device with the stereo camera module assembled therein. Further, steps 612, 614 and 616 are optional, depending upon actual design consideration. As a person skilled in the art can readily understand details of each step shown in FIG. 6 after reading above paragraphs, further description is omitted here for brevity.

In accordance with the first stereo camera calibration solution mentioned above, the module house is required to provide a feature point set of a 3D calibration pattern by applying one-shot calibration to a stereo camera module. To spare the effort and cost of the module house, the present invention further proposes a second stereo camera calibration solution which employs a machine learning technique to obtain a learned feature point set for stereo camera calibration. In accordance with the second stereo camera calibration solution discussed hereinafter, the stereo camera calibration needs no calibration pattern, allows more flexibility to the platform hardware (e.g., a central processing unit (CPU), a graphics processing unit (GPU), etc.), and offers more robustness to the dynamic tile of image sensors.

Figure 7:
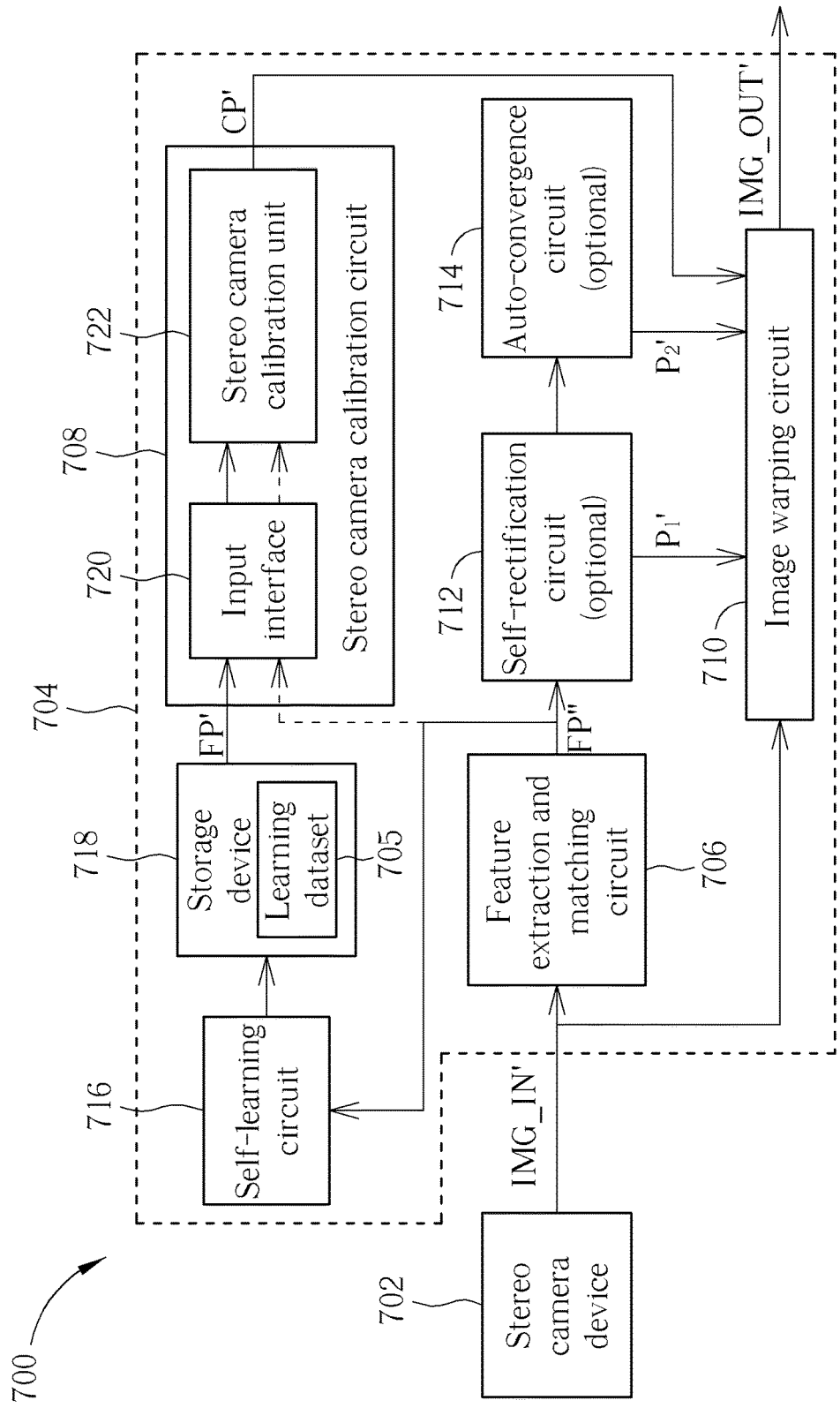
FIG. 7 is a diagram illustrating another electronic device supporting an on-line stereo camera calibration according to an embodiment of the present invention.
Figure 8:
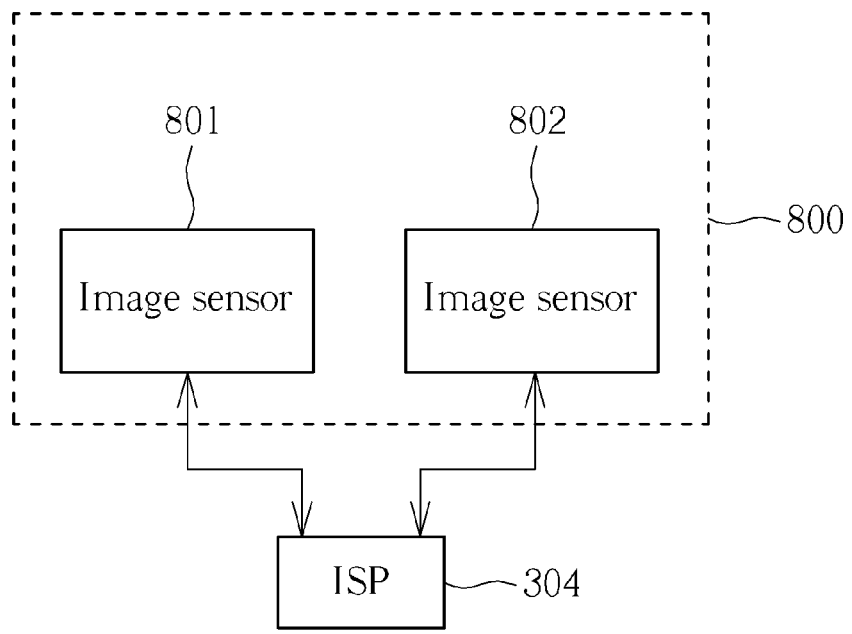
FIG. 8 is a diagram illustrating a module-less stereo camera having two symmetric single-lens image sensors.
Figure 9:
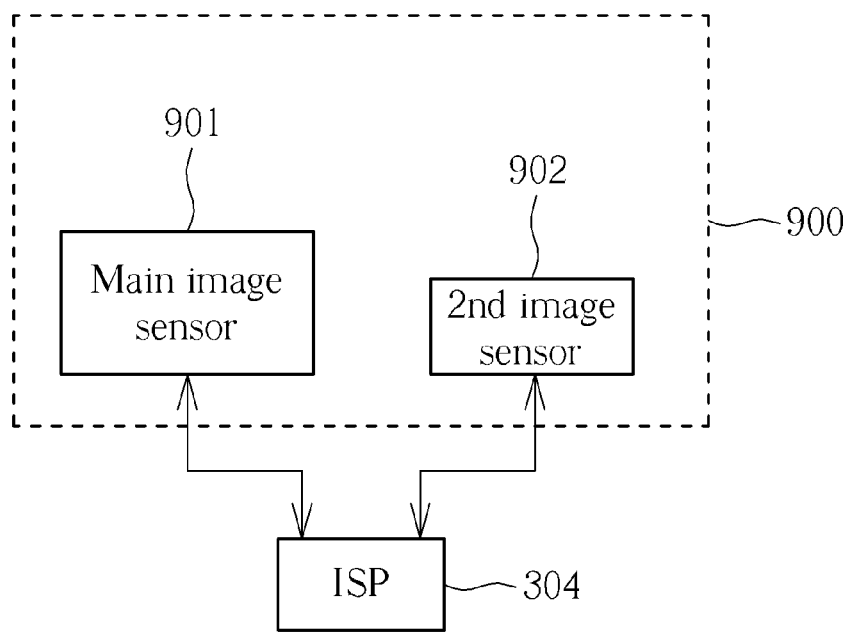
FIG. 9 is a diagram illustrating a module-less stereo camera having two asymmetric single-lens image sensors.

FIG. 7 is a diagram illustrating another electronic device supporting an on-line stereo camera calibration according to an embodiment of the present invention. By way of example, but not limitation, the electronic device 700 maybe a mobile phone. As shown in FIG. 7, the electronic device 700 includes a stereo camera device 702 and an on-line stereo camera calibration device 704. In one exemplary design, the stereo camera device 702 maybe the stereo camera module 300 shown in FIG. 3 or the stereo camera module 400 shown in FIG. 4. In another exemplary design, the stereo camera device 702 may be a module-less stereo camera 800 having two symmetric single-lens image sensors 801 and 802 (i.e., individual image sensors with the same resolution that are separately provided without being packed as one stereo camera module), as shown in FIG. 8, or may be a module-less stereo camera 900 having two asymmetric single-lens image sensors, including a main image sensor 901 and a second (auxiliary) image sensor 902 (i.e., individual image sensors with different resolutions that are separately provided without being packed as one stereo camera module), as shown in FIG. 9. Hence, the electronic device 700 performs the learning-based stereo camera calibration, regardless of the type of the stereo camera device 702. In one embodiment, when the module-less stereo camera 800/900 is assembled in an electronic device, the module-less stereo camera 800/900 may be connected to an ISP 304 with a bridge circuit integrated therein. Hence, no external bridge IC coupled between an ISP and individual image sensors is needed.

The on-line stereo camera calibration device 704 may be integrated in a baseband processing chip of the electronic device 700. In this embodiment, the on-line stereo camera calibration device 704 includes a feature extraction and matching circuit 706, a stereo camera calibration circuit 708, an image warping circuit 710, one or more optional image processing circuits (e.g., self-rectification circuit 712 and/or auto-convergence circuit 714), a self-learning circuit 716, and a storage device 718.

The feature extraction and matching circuit 706 is implemented to process a stereo image input IMG_IN' derived from an output of the stereo camera device 702 to extract feature points in a left-view image and a right-view image included in each stereo image pair included in the stereo image input IMG_IN' and find the matching/correspondence between the left-view image and the right-view image included in each stereo image pair of the stereo image input IMG_IN'. It should be noted that the stereo image input IMG_IN' may be a direct stereo capture output of the stereo camera module 104 or may be a processing result generated from at least one image processing stage in an ISP (e.g., 304 shown in FIG. 3/FIG. 4) according to the stereo capture output of the stereo camera device 702.

The self-learning circuit 716 is configured to perform a self-learning operation upon a feature extraction and matching result (e.g., a current feature point set FP") generated from the feature extraction and matching circuit 706 to generate a learning dataset 705 and store the learning dataset 705 in the storage device 718. For example, the storage device 718 may be a non-volatile memory. Specifically, while the user is using the electronic device (e.g., mobile phone) 700 to obtain stereo image pairs each composed of one left-view image and one right-view image, the learning dataset 705 in the storage device 718 is created and updated due to incremental learning of the self-learning operation. In other words, the learning dataset 705 may be updated in response to reliable matched feature points found in the stereo image input IMG_IN'. However, using the self-learning circuit 716 to process an output of the feature extraction and matching circuit 706 is for illustrative purposes only. In practice, any machine learning based manner capable of creating a learning dataset required for stereo camera calibration may be adopted. In other words, generating a learning dataset by machine learning and retrieving a feature point set from the learning dataset would fall within the scope of the present invention.

Concerning the stereo camera calibration circuit 708, it includes an input interface 720 and a stereo camera calibration circuit 722. The input interface (e.g., a memory interface) 720 is configured to retrieve the feature point set FP' from the storage device 718 and supply the retrieved feature point set FP' to the stereo camera calibration unit 722. Since the feature point set FP' is retrieved from the learning dataset 705 stored in the storage device 718, the feature point set FP' may be regarded as having historical feature points gathered from stereo image pairs generated by the stereo camera device 702 during the self-learning process.

The stereo camera calibration unit 722 is configured to calculate a stereo camera parameter set CP' according to at least the retrieved feature point set FP'. Specifically, based on the calibration model employed by the image warping circuit 710, the stereo camera calibration unit 722 generates the stereo camera parameter set CP' needed by the employed calibration model. For example, when the image warping circuit 710 is configured to employ a single-warp solution, the stereo camera calibration unit 722 generates one stereo camera parameter set CP' meeting the requirement of the single-warp solution; and when the image warping circuit 710 is configured to employ a dual-warp solution, the stereo camera calibration unit 722 generates another stereo camera parameter set CP' meeting the requirement of the dual-warp solution.

Alternatively, the input interface 720 may be further configured to receive a current feature point set FP''', including reliable matched feature points, from the feature extraction and matching circuit 706. Hence, the stereo camera calibration circuit 722 may be configured to generate the stereo camera parameter set CP' based on the learned feature point set (i.e., feature point set FP' retrieved from the learning dataset 705) and the current feature point set FP''' currently generated from the feature extraction and matching circuit 706. This also falls within the scope of the present invention.

The stereo camera parameter set CP' may be referenced for geometric calibration of the stereo camera. For example, the stereo camera parameter set CP' may include intrinsic parameters of the stereo camera device 702 and/or extrinsic parameters of the stereo camera device 702. The intrinsic parameters are related to the relationship between a lens and a corresponding image sensor, and may include lens distortion and a calibration matrix, including focal lengths, principle points, skew parameters, etc. The extrinsic parameters are related to the relationship between one set of a lens and a corresponding image sensor and the other set of a lens and a corresponding image sensor, and may include translation correction, rotational correction, etc.

In this embodiment, the image warping circuit 710 is configured to perform an image warping operation upon the stereo image input IMG_IN' according to at least the stereo camera parameter set CP', and accordingly generate a calibrated stereo image output IMG_OUT'. The image quality degradation resulting from errors of the stereo camera device 702 can be avoided/mitigated by the image warping operation performed based on at least the stereo camera parameter set CP'. It should be noted that the image warping operation may be a single-warp operation (which adjusts only one of a left-view image and a right-view image included in a stereo image pair) or a dual-warp operation (which adjusts both of a left-view image and a right-view image included in a stereo image pair), depending upon the actual platform design of the electronic device 700.

In addition to the stereo camera parameter set CP', the image warping circuit 710 may be configured to use more parameter sets to make the calibrated stereo image output IMG_OUT' have better visual quality. For example, the self-rectification circuit 712 refers to a feature extraction and matching result to determine a self-rectification parameter set $P_1$' used to refine the geometry constraint. The auto-convergence circuit 714 refers to an output of the feature extraction and matching circuit 706 (if the self-rectification circuit 712 is omitted) or an output of the self-rectification circuit 712 (if the self-rectification circuit 712 is used) to determine an auto-convergence parameter set $P_2$' used to adjust the disparity between the left-view image and the right-view image included in the stereo image pair for better visual effect on a 3D display. In this case, the image warping circuit 710 generates the calibrated stereo image output IMG_OUT' by applying image warping to the stereo image input IMG_IN' according to the stereo camera parameter set CP' and at least one of the self-rectification parameter set $P_1$' and the auto-convergence parameter set $P_2$'.

Figure 10:
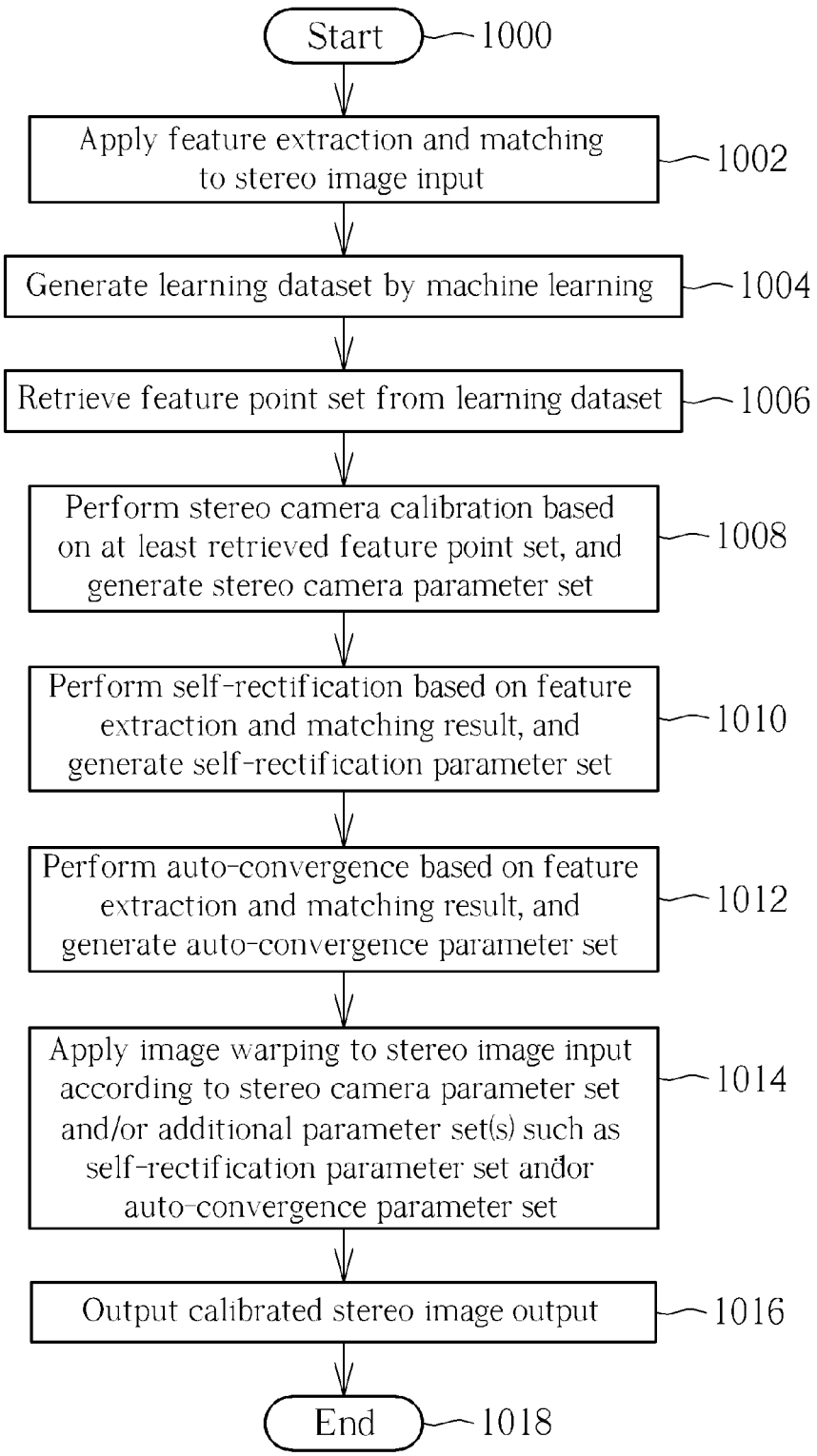
FIG. 10 is a flowchart illustrating a second stereo camera calibration solution according to an embodiment of the present invention.

FIG. 10 is a flowchart illustrating a second stereo camera calibration solution according to an embodiment of the present invention. Provided that the result is substantially the same, the steps are not required to be executed in the exact order shown in FIG. 10. The second stereo camera calibration solution proposed by the present invention may include following steps.

Step 1000: Start.

Step 1002: Apply feature extraction and matching to a stereo image input derived from a stereo capture output of a stereo camera device. In one exemplary design, the stereo camera device may be a stereo camera module. In another exemplary design, the stereo camera device may be module-less and have two single-lens image sensors individually provided.

Step 1004: Generate a learning dataset by machine learning. For example, a self-learning operation is performed to obtain the learning dataset.

Step 1006: Retrieve a feature point set from the learning dataset.

Step 1008: Perform a stereo camera calibration procedure based on at least the retrieved feature point set, and accordingly generate a stereo camera parameter set.

Step 1010: Perform a self-rectification procedure based on a feature extraction and matching result, and accordingly generate a self-rectification parameter set.

Step 1012: Perform an auto-convergence procedure based on the feature extraction and matching result, and accordingly generate an auto-convergence parameter set.

Step 1014: Apply image warping to the stereo image input according to at least the stereo camera parameter set. For example, the image warping operation is performed based on the stereo camera parameter set and additional parameter set(s) such as the self-rectification parameter set and/or the auto-convergence parameter set.

Step 1016: Output a calibrated stereo image output.

Step 1018: End.

In one embodiment, all of steps 1002-1016 are performed on an electronic device with the stereo camera device assembled therein. Further, at least one of steps 1010 and 1012 may be omitted, depending upon actual design consideration. As a person skilled in the art can readily understand details of each step shown in FIG. 10 after reading above paragraphs, further description is omitted here for brevity.

In accordance with the first stereo camera calibration solution mentioned above, a camera parameter set used for stereo camera calibration is generated based on a feature point set provided by the module house. In accordance with the second stereo camera calibration solution mentioned above, a camera parameter set used for stereo camera calibration is generated based on at least a feature point set derived from a learning dataset maintained by a self-learning process. In an alternative design, using feature points obtained from both of a feature point set provided by the module house and a feature point set derived from a learning dataset to obtain a camera parameter set is feasible. Moreover, as can be seen from FIG. 5 and FIG. 7, neither a feature point set provided by the module house nor a feature point set derived from a learning dataset is involved in the self-rectification operation. In an alternative design, one or both of a feature point set provided by the module house and a feature point set derived from a learning dataset may be used to provide feature points needed by the self-rectification operation.

Figure 11:
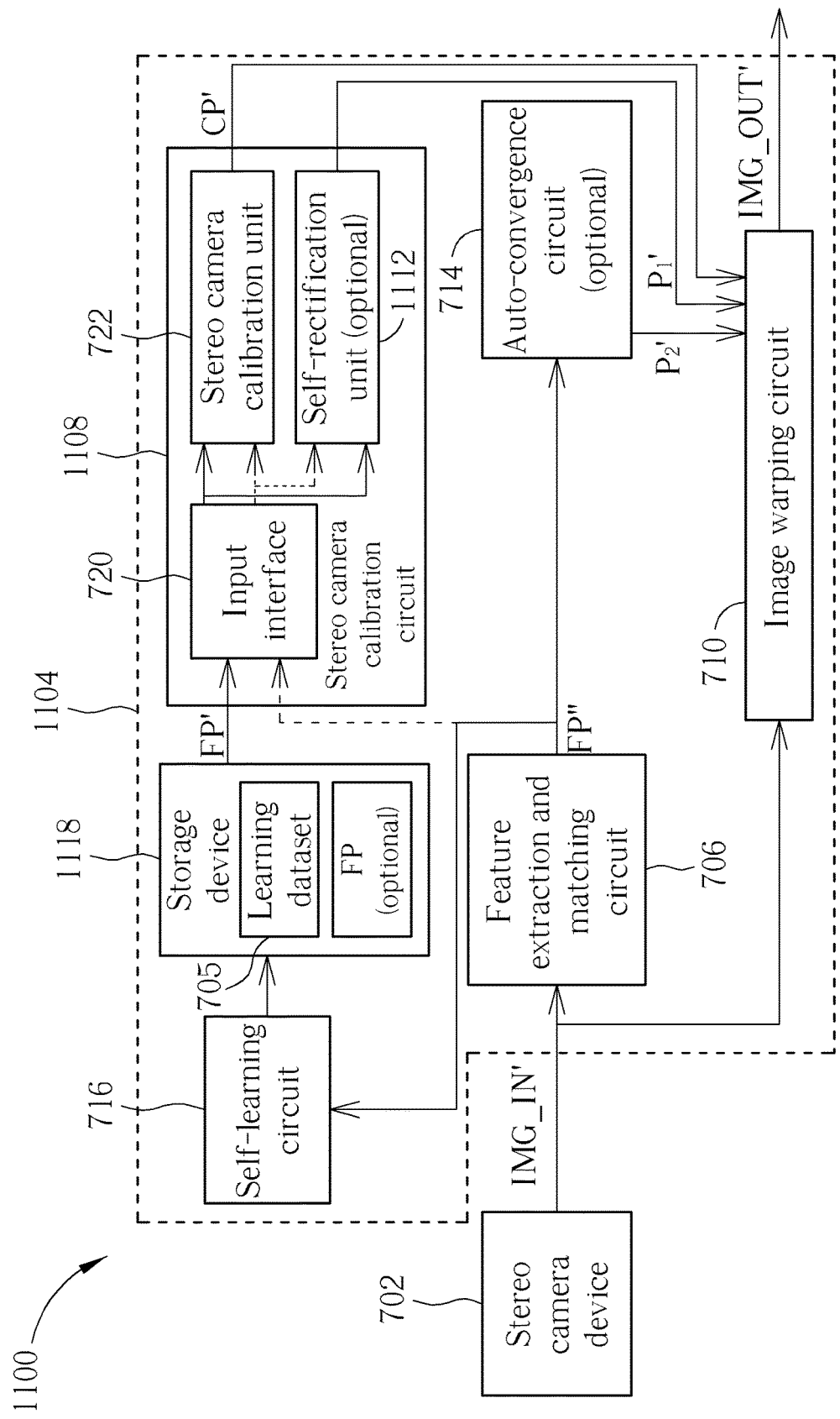
FIG. 11 is a diagram illustrating yet another electronic device supporting an on-line stereo camera calibration according to an embodiment of the present invention.

Please refer to FIG. 11, which is a diagram illustrating yet another electronic device supporting an on-line stereo camera calibration according to an embodiment of the present invention. The electronic device 1100 may be obtained by modifying the electronic device 700 shown in FIG. 7. Besides the learning dataset 705 created and updated by the self-learning circuit 716, the storage device 1118 of the on-line stereo camera calibration device 1104 may further store the feature point set FP provided by the module house. In this embodiment, the feature point set FP' retrieved by the input interface 720 may be derived from the feature point set FP, the learning dataset 705, or a combination of the feature point set FP and the learning dataset 705. In other words, it is possible that at least a portion (i.e., part or all) of the retrieved feature point set FP' is derived from the feature point set FP, or at least a portion (i.e., part or all) of the retrieved feature point set FP' is derived from the learning dataset 705. For example, one portion of the feature point set FP' may include feature points recorded in the feature point set FP, and another portion of the feature point set FP' may include feature points recorded in the learning dataset 705.

The retrieved feature point set FP' is fed into the stereo camera calibration unit 722. Hence, the stereo camera parameter set CP' may be generated based on feature points derived from the feature point set FP, the learning dataset 705, or the combination of the feature point set FP and the learning dataset 705, depending upon the actual design consideration.

In this embodiment, the stereo camera calibration circuit 1108 further includes an optional self-rectification unit 1112. The function and operation of the self-rectification unit 1112 are similar to that of the self-rectification circuit 712. The major difference between the self-rectification unit 1112 and the self-rectification circuit 712 is that the self-rectification unit 1112 may use the retrieved feature point set FP' as its input. Hence, the self-rectification parameter set $P_1'$ maybe generated based on feature points derived from the feature point set FP, the learning dataset 705, or the combination of the feature point set FP and the learning dataset 705, depending upon the actual design consideration.

In this embodiment, the learning dataset 705 and the feature point set FP are stored in the same storage device 1118. However, this is not meant to be a limitation of the present invention. Alternatively, the feature point set FP and the learning dataset 705 may be stored in different storage devices (e.g., 108 and 718).

As a person skilled in the art can readily understand details of other circuit elements shown in FIG. 11 after reading above paragraphs directed to the embodiment shown in FIG. 7, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An self-adapted stereo camera calibration method employed by an electronic device with a stereo camera device, comprising:
retrieving a feature point set, comprising:
retrieving at least a portion of the feature point set from a storage device;
utilizing a stereo camera calibration circuit on the electronic device to calculate a stereo camera parameter set based on at least the retrieved feature point set; and
performing an image warping operation, by an image warping circuit in an image processing chip of the electronic device, upon a stereo image input derived from an output of the stereo camera device according to at least the stereo camera parameter set, and accordingly generating a calibrated stereo image output;
wherein before the stereo camera device is assembled in the electronic device, at least the portion of the feature point set is obtained via the stereo camera device and stored into the storage device; at least the portion of the feature point set comprises feature points extracted from a stereo image pair that is obtained via the stereo camera device before the stereo camera device is assembled in the electronic device; the stereo camera parameter set is calculated after the stereo camera device is assembled in the electronic device; and after the stereo camera device is assembled in the electronic device, at least a portion of the feature points that are obtained before the stereo camera device is assembled in the electronic device is involved in calculating the stereo camera parameter set.

2. The self-adapted stereo camera calibration method of claim 1, wherein the stereo camera device comprises a stereo camera module.

3. The self-adapted stereo camera calibration method of claim 2, wherein at least the portion of the feature point set is obtained at a module house that manufactures the stereo camera module.

4. The self-adapted stereo camera calibration method of claim 2, wherein at least the portion of the feature point set is obtained by one-shot calibration performed upon the stereo camera module according to a calibration pattern.

5. The self-adapted stereo camera calibration method of claim 1, wherein the electronic device is a mobile phone.

6. A self-adapted stereo camera calibration method employed by an electronic device with a stereo camera device, comprising:
generating a training dataset by machine learning, wherein at least a portion of the training dataset is retrieved from the stereo camera device, and the machine learning comprises:
obtaining matched feature points found in a current stereo image input derived from an output of the stereo camera device; and
updating the training dataset by at least one matched feature point, wherein the at least one matched feature point is determined from the matched feature points according to reliability of the matched feature points;
utilizing a stereo camera calibration circuit on the electronic device to calculate a stereo camera parameter set based on at least data retrieved from the training dataset; and
performing an image warping operation, by an image warping circuit in an image processing chip of the electronic device, upon a stereo image input derived from an output of the stereo camera device according to at least the stereo camera parameter set, and accordingly generating a calibrated stereo image output.

7. The self-adapted stereo camera calibration method of claim 6, wherein the step of generating the training dataset comprises:

performing a feature extraction and matching operation upon a stereo image input derived from an output of the stereo camera device to generate a feature extraction and matching result; and performing a self-learning operation upon the feature extraction and matching result to generate the training dataset.

8. The self-adapted stereo camera calibration method of claim 6, wherein the stereo camera device comprises a stereo camera module.

9. The self-adapted stereo camera calibration method of claim 6, wherein the stereo camera device is module-free and has two single-lens image sensors that constitute a stereo system.

10. A self-adapted stereo camera calibration device on an electronic device with a stereo camera device, comprising:
 a stereo camera calibration circuit, comprising:
  an input interface, configured to retrieve a feature point set;
  a stereo camera calibration circuit, configured to calculate a stereo camera parameter set based on at least the retrieved feature point set; and
 a storage circuit, configured to store at least a portion of the feature point set; and
 an image warping circuit in an image processing chip of the electronic device, configured to perform an image warping operation upon a stereo image input derived from an output of the stereo camera device according to at least the stereo camera parameter set, and accordingly generate a calibrated stereo image output;
 wherein before the stereo camera device is assembled in the electronic device, at least the portion of the feature point set is obtained via the stereo camera device and stored into the storage circuit; at least the portion of the feature point set comprises feature points extracted from a stereo image pair that is obtained via the stereo camera device before the stereo camera device is assembled in the electronic device; the stereo camera parameter set is calculated after the stereo camera device is assembled in the electronic device; after the stereo camera device is assembled in the electronic device, at least a portion of the feature points that are obtained before the stereo camera device is assembled in the electronic device is involved in calculating the stereo camera parameter set; and the input interface retrieves at least the portion of the feature point set from the storage circuit.

11. The self-adapted stereo camera calibration device of claim 10, wherein the stereo camera device comprises a stereo camera module.

12. The self-adapted stereo camera calibration device of claim 11, wherein at least the portion of the feature point set is stored into the storage circuit at a module house that manufactures the stereo camera module.

13. The self-adapted stereo camera calibration device of claim 11, wherein at least the portion of the feature point set has feature points in a left-view image and a right-view image included in a single stereo image pair generated by the stereo camera module shooting a calibration pattern.

14. The self-adapted stereo camera calibration device of claim 10, wherein the electronic device is a mobile phone.

15. A self-adapted stereo camera calibration device on an electronic device with a stereo camera device, comprising:
 a storage circuit, configured to store a training dataset generated by machine learning, wherein at least a portion of the training dataset is retrieved from the stereo camera device, and the machine learning running on the self-adapted stereo camera calibration device comprises:
  obtaining matched feature points found in a current stereo image input derived from an output of the stereo camera device; and
  updating the training dataset by at least one matched feature point, wherein the at least one matched feature point is determined from the matched feature points according to reliability of the matched feature points;
 a stereo camera calibration circuit, comprising:
  an input interface, configured to retrieve data of the training dataset from the storage circuit; and
  a stereo camera calibration circuit, configured to calculate a stereo camera parameter set based on at least the data of the training dataset; and
 an image warping circuit in an image processing chip of the electronic device, configured to perform an image warping operation upon a stereo image input derived from an output of the stereo camera device according to at least the stereo camera parameter set, and accordingly generate a calibrated stereo image output.

16. The self-adapted stereo camera calibration device of claim 15, further comprising:
 a feature extraction and matching circuit, configured to process a stereo image input derived from an output of the stereo camera device to generate the feature extraction and matching result; and
 a self-learning circuit, configured to perform a self-learning operation upon the feature extraction and matching result to generate the training dataset.

17. The self-adapted stereo camera calibration device of claim 15, wherein the stereo camera device comprises a stereo camera module.

18. The self-adapted stereo camera calibration device of claim 15, wherein the stereo camera device is module-free and has two single-lens image sensors that constitute a stereo system.

* * * * *